United States Patent Office 3,361,687
Patented Jan. 2, 1968

3,361,687
SELF-EXTINGUISHING FINELY DIVIDED EXPANDABLE PLASTICS COMPOSITIONS
Erhard Stahnecker, Ziegelhausen, Germany, assignor to Badische Anilin- & Soda-Fabrik Aktiengesellschaft, Ludwigshafen (Rhine), Germany
No Drawing. Filed Feb. 14, 1964, Ser. No. 344,816
Claims priority, application Germany, Feb. 19, 1963, B 70,791
8 Claims. (Cl. 260—2.5)

This invention relates to self-extinguishing expandable plastics compositions. More specifically, the invention relates to plastics compositions containing copolymers of styrene and acrylonitrile together with flameproofing agents containing bromine and also an expanding agent.

It is known that self-extinguishing foam structures can be prepared by expanding plastics compositions which contain an expandable styrene polymer and an organic halogen compound of low volatility as a flameproofing agent.

The organic halogen compounds may be incorporated into the plastics composition in various ways. For example it is possible to coat particles of the expandable styrene polymer with an organic halogen compound. It has been found however that when processing such polymer particles having self-extinguishing properties into forms, difficulties are encountered. During handling of the particles or during expansion, the halogen compound may be rubbed off so that the foam formed therefrom does not contain the desired proportion of low-volatility halogen compound. Moreover, the portion of the flameproofing agent which has been rubbed off may clog up the preexpansion equipment or may be deposited in the molds, so that the said equipment must be frequently cleaned.

In another prior art method, the monomers are polymerized in the presence of the organic halogen compounds. In this way, polymers are obtained which contain the flameproofing agent in homogeneous distribution. If the halogen compounds used are soluble in the styrene polymer, more or less markedly plasticized expandable plastics compositions are obtained. It is a disadvantage that prepuff of plastics thus flameproofed, and foam structures prepared therefrom, shrink. It is therefore impossible to prepare true to size foams with such plastics compositions. The moldings obtained must be subsequently machined so that another operation becomes necessary and loss of material occurs. Plastics compositions which contain flameproofing agents which do not dissolve in the polymer are fused incompletely when expanded so that articles having low mechanical stability are obtained.

It is an object of this invention to provide self-extinguishing expandable plastics compositions. Another object of the invention is to provide expandable self-extinguishing plastics compositions from which it is possible to prepare moldings which do not shrink. Other objects of the invention will become apparent from the following detailed description of the invention.

The objects of the invention are achieved by plastics compositions which contain:

(A) a thermoplastic styrene copolymer which contains 95 to 99.5% by weight of styrene and 5 to 0.5% by weight of acrylonitrile or at least 80% by weight of styrene, 0.5 to 5% by weight of acrylonitrile and not more than 15% by weight of one or more other monomeric polymerizable $\alpha,\beta$-unsaturated compounds;

(B) an organic bromine compound having a bromine content of more than 50% by weight, the amount of the bromine compound being such that the bromine content of the mixture is 0.5 to 6% by weight with reference to the styrene copolymer; and (C) 2 to 20% by weight, with reference to the styrene copolymer, of an expanding agent.

It is a particular advantage that the prepuff obtained from the expandable self-extinguishing plastics compositions according to the invention, and foams prepared therefrom, do not shrink during or after their production so that foams do not have to be machined. Compositions which contain a copolymer of 99 to 97% by weight of styrene and 1 to 3% by weight of acrylonitrile have particularly advantageous properties. Copolymers which contain smaller or larger amounts of acrylonitrile than 0.5 to 5% by weight do not exhibit the favorable properties of the abovementioned copolymers. Compositions comprising a copolymer containing more than 5% by weight of acrylonitrile in polymerized form are fused unsatisfactorily during processing into expanded moldings. In the production of expandable copolymers from styrene and acrylonitrile having an acrylonitrile content of more than 5% by weight by the bead polymerization method, bead polymers are moreover obtained which are particularly finely divided as compared with those having a lower acrylonitrile content. This is a disadvantage because such finely divided expandable compositions cannot generally be used. For example they cannot be processed into expanded materials having particularly low unit weight. Furthermore the particles in expanded moldings from particularly finely divided compositions have unsatisfactory fusion characteristics.

In addition to styrene and acrylonitrile, the copolymers may also contain other monomer polymerizable $\alpha,\beta$-unsaturated compounds in polymerized form. Examples of suitable copolymerization components are esters of acrylic acid and methacrylic acid with alcohols having one to eight carbon atoms, nuclear halogenated styrenes, such as o-chlorostyrene or p-chlorostyrene, nuclear alkylated styrenes such as 2,4-dimethylstyrene or p-isopropyl styrene, or, in amounts of 0.01 to 0.5% by weight with reference to the monomers, divinyl compounds, such as divinylbenzene.

Organic bromine compounds having a bromine content of more than 50% by weight, such as aliphatic and cycloaliphatic compounds containing more than one bromine atom, are suitable as flame-proofing agents. Examples of such compounds are brominated polymers of butadiene or isoprene having a degree of polymerization of 2 to 20, such as octabromohexadecane, tetrabromocyclooctaine, hexabromocyclododecane, tetrabromocyclododecane; pentabromomonochlorostyrene, for example, is also suitable. Esters and acetals of 2,3-dibromopropanol, such as tris-(2,3-dibromopropyl) phosphate, are also suitable. The compositions should contain such amounts of bromine compounds (with reference to the styrene copolymers) that the bromine content is at least 0.5% by weight. In general it is not necessary for the composition to contain more than 6% by weight of bromine with reference to the styrene copolymer.

Organic compounds which are liquid or gaseous at room temperature and which do not dissolve the copolymer are suitable as expanding agents. Examples are readily volatile organic compounds whose boiling point under standard conditions (i.e. at a pressure of 760 mm. Hg) is below 100° C., e.g. saturated aliphatic hydrocarbons, such as propane, butane, hexane, heptane and particularly saturated aliphatic hydrocarbons containing five carbon atoms, such as n-pentane; perchloroperfluorocarbons, such as dichlorodifluormethane, are also suitable. From 2 to 20%, advantageously from 3 to 10%, by weight of expanding agent, with reference to the styrene copolymer, is contained in the compositions.

The compositions may also contain additives, such as lubricants, fillers, dyes, plasticizers, insecticides, fungicides, optical brighteners or antistatic agents. It is advantageous to incorporate with the compositions, substances which improve the flameproofing effect. Examples of such substances are certain organic peroxides or organic metal complex compounds.

It is advantageous to prepare the compositions by polymerizing the mixture of monomers in aqueous suspension in the presence of the expanding agent and the organic halogen compounds. The expanding agent may however be added to the monomers during the polymerization or to the compositions after the polymerization is over.

Expandable plastics compositions according to this invention may be expanded for example by heating with steam or hot air. If heating of the compositions is carried out in molds from which gases may escape but not the plastic, the compositions expand and are fused together to form moldings. The expandable self-extinguishing compositions may also be processed for example by means of extruders or injection molding machines to form articles having foam structure.

The articles are self-extinguishing, i.e. they burn only when they are brought into contact with a flame and cease to burn when removed from the flame.

The invention is further illustrated by the following examples in which the parts specified are parts by weight.

*Example 1*

A number of batches, each of 20,000 parts of water, 32 parts of a copolymer of 95 parts of N-vinylpyrrolidone and 5 parts of methyl acrylate having a K-value of 80, 10 parts of sodium pyrophosphate (10,000—X) parts of styrene, X parts of acrylonitrile, 35 parts of benzoyl peroxide, 310 parts of 1,2,5,6-tetrabromocyclooctane and 580 parts of n-pentane, is introduced into a pressure-tight vessel having a flat paddle agitator.

In the various batches, X has the following values:

| Batch: | Parts |
|---|---|
| a | 0 |
| b | 50 |
| c | 100 |
| d | 200 |
| e | 300 |
| f | 400 |
| g | 500 |
| h | 750 |
| i | 1000 |
| k | 1500 |
| l | 2000 |

Batches $a$ to $l$ are kept for twenty hours at 70° C. and for fifteen hours at 85° C. while stirring, the rate of stirring being the same in each case. Finely divided expandable compositions are obtained which are washed and dried.

The compositions are processed into self-extinguishing foam blocks in a perforated mold having the dimensions 100 x 100 x 30 cm. by means of steam. Such amounts of the expandable materials are used for the production of the blocks that the density is 20 g./liter.

The table below indicates the degree of fusion and the shrinkage of foam structures prepared from the compositions and also the bead distribution in the expandable compositions.

The degree of fusion (columns W) is the percentage proportion of beads which break away from a sheet having the dimensions 100 x 100 x 2 cm. (cut from the middle of the foam block having the dimensions 100 x 100 x 30 cm.) when the sheet is broken up. Unfused beads separate along the grain interface when an expanded sheet is fractured.

The degree of shrinkage (columns S) is the inward curvature of the two side faces (100 x 100 cm.) of the foam block with reference to the thickness of the block. For example if the two side faces curve inwardly by 1.5 cm. together, the degree of shrinkage would be 5% in the case of a block thickness of 30 cm.

Section I of the table gives the degrees of fusion and shrinkage when steam at a pressure of 0.5 atmosphere gauge is used for an expansion period of thirty seconds, while section II gives the degrees of fusion and shrinkage when steam at 0.8 atmosphere gauge is used for ten seconds; section III gives the percentage distribution of beads, the diameter in mm. of the beads being given in the various columns as follows:

(i) more than 2.5, (ii) 2.5 to 2.0, (iii) 2.0 to 1.5, (iv) 1.5 to 0.8, (v) 0.8 to 0.4, and (vi) less than 0.4.

As may be seen from section I of the table, in the case of expandable polymers having a percentage by weight of acrylonitrile (column A) of 0.5 to 5, foam structures are obtained which undergo but little shrinkage and in which the individual particles exhibit good fusion. If the degree of fusion is improved by using higher temperature for the expansion (section II), the degree of shrinkage of the foam blocks increases considerably.

A higher content of acrylonitrile (column A) also influences the bead spectrum (section III). The increase in the finer components of the bead spectrum occasioned by the increased content of acrylonitrile cannot be compensated with the necessary reliability by decreasing the speed of the stirrer or by decreasing the amount of protective colloid. There is therefore a risk that the batch will coagulate. Column B in the table indicates the batch used. The letter "t" in column ii means "traces."

TABLE

| B | A | I | | II | | III | | | | | |
|---|---|---|---|---|---|---|---|---|---|---|---|
| | | W | S | W | S | i | ii | iii | iv | v | vi |
| a | 0 | 40 | 10 | 30 | 16 | ---- | 4 | 40 | 50 | 6 | ------ |
| b | 0.5 | 60 | 5 | 50 | 12 | ---- | 4 | 40 | 50 | 6 | ------ |
| c | 1.0 | 80 | 2 | 60 | 10 | ---- | 2 | 40 | 52 | 6 | ------ |
| d | 2.0 | 80 | 1.5 | 60 | 10 | ---- | 1 | 38 | 53 | 8 | ------ |
| e | 3.0 | 70 | 2 | 60 | 10 | ---- | 1 | 36 | 54 | 8 | 1 |
| f | 4.0 | 60 | 2 | 60 | 10 | ---- | 0.5 | 34 | 55 | 9 | 1.5 |
| g | 5.0 | 60 | 2 | 60 | 10 | ---- | 0.5 | 34 | 55 | 9 | 1.5 |
| h | 7.0 | 40 | 2 | 45 | 10 | ---- | t | 25 | 60 | 12 | 3 |
| i | 10.0 | 35 | 2 | 40 | 10 | ---- | t | 16 | 64 | 16 | 4 |
| | 15.0 | 25 | 2 | 40 | 10 | ---- | ------ | 14 | 65 | 16 | 5 |
| l | 20.0 | 20 | 2 | 40 | 10 | ---- | ------ | 10 | 68 | 17 | 5 |

*Example 2*

10,000 parts of styrene and 100 parts of acrylonitrile are suspended in a solution of 32 parts of a copolymer from 95 parts of N-vinylpyrrolidone and 5 parts of methyl acrylate having a K-value of 80 and 10 parts of sodium pyrophosphate in 20,000 parts of water in the presence of 20 parts of dimethyl glycol phthalate, 310 parts of 1,2,5,6,9,10-hexabromocyclododecane and 650 parts of pentane, and also 50 parts of benzoyl peroxide in an autoclave and polymerized while stirring for twenty hours at 70° C. and fifteen hours at 85° C.

A finely divided expandable plastics composition is obtained which can be processed by heating in perforated molds to form microporous foam articles which do not shrink. The individual polymer particles in the moldings exhibit good fusion. The moldings burn only while they are in an extraneous flame and cease to burn immediately when they are removed from the flame.

Compositions which contain tetrabromocyclooctane instead of hexabromocyclododecane as the flameproofing agent are suitable in the same way for the production of self-extinguishing foam plastics.

*Example 3*

9,250 parts of styrene and 200 parts of acrylonitrile are suspended in a solution of 32 parts of a copolymer of 95 parts of N-vinylpyrrolidone and 5 parts of methyl acrylate having a K-value of 80 and 10 parts of sodium pyrophosphate in 20,000 parts of water in the presence of 400 parts of pentabromomonochlorocyclohexane and 45 parts of benzoyl peroxide in an autoclave and polymerized for twenty hours at 70° C. and for forty-five hours at 85° C. while stirring. Ten hours after the beginning of the polymerization, 400 parts of pentane is added to the mixture during ninety minutes, and thirty-five hours after the beginning of the polymerization a mixture of 400 parts of pentane, 600 parts of methanol and 35 parts of ferrocene are added within one hour.

A finely divided expandable plastics composition is obtained which can be processed into microporous self-extinguishing foam products that do not shrink. The individual particles of the composition are completely fused together.

Example 4

10,000 parts of styrene, 200 parts of acrylonitrile and 100 parts of emthyl methacrylate are suspended in a solution of 32 parts of copolymer of 95 parts of N-vinylpyrrolidone and 5 parts of methyl acrylate and 10 parts of sodium pyrophosphate in 20,000 parts of water in an autoclave and polymerized in the presence of 310 parts of 1,2,5,6-tetrabromocyclooctane, 20 parts of di-tertiary butyl peroxide, 50 parts of benzoyl peroxide and 650 parts of pentane for twenty hours at 70° C. and for fifteen hours at 85° C. while stirring.

A finely divided expandable composition is obtained which can be processed into microporous foam products that do not shrink. The individual particles of the composition are completely fused together. The articles burn only in an extraneous flame and cease to burn immediately when they are removed from the flame.

In the same way as described above, 9500 parts of styrene, 200 parts of acrylonitrile and 1500 parts of methyl methacrylate are polymerized in the presence of the above-mentioned substances. A finely divided expandable composition is obtained which can be processed into microporous shapes.

Example 5

9600 parts of styrene, 400 parts of acrylonitrile, and 500 parts of 2,4-dimethylstyrene are suspended in a solution of 32 parts of a copolymer of 95 parts of N-vinylpyrrolidone and 5 parts of methyl acrylate and 10 parts of sodium pyrophosphate in 20,000 parts of water in an autoclave and polymerized in the presence of 400 parts of tris-(2,3-dibromopropyl) phosphate under the action of 20 parts of di-tertiary butyl peroxide, 50 parts of benzoyl peroxide and 670 parts of pentane for twenty hours at 70° C. and for fifteen hours at 85° C. while stirring.

A finely divided expandable composition is obtained which can be processed into self-extinguishing foam products.

Example 6

10,000 parts of styrene, 200 parts of acrylonitrile, 100 parts of 2-ethylhexyl acrylate, 200 parts of 1,2,5,6,9,10-hexabromocyclododecane and 1000 parts of dichlorodifluoromethane are suspended in a solution of 30 parts of poly-N-vinylpyrrolidone having a K-value of 70 and 10 parts of sodium pyrophosphate in 20,000 parts of water. The suspension is stirred for twenty hours at 70° C. and fifteen hours at 85° C. A finely divided expandable composition is obtained which can be processed by heating in perforated molds to form microporous foam products.

Moldings prepared from such a composition do not shrink and the particles of the polymer show good fusion.

Example 7

By the method described in Example 4, the following batches are polymerized:

(a) 9400 parts of styrene, 600 parts of a mixture of equal parts of o-chlorobenzene and p-chlorobenzene, 100 parts of acrylonitrile in the presence of 200 parts of 1,2,5,6,9,10-hexabromocyclododecane and 650 parts of pentane;

(b) 9000 parts of styrene, 1000 parts of p-isopropylstyrene, 300 parts of acrylonitrile in the presence of 400 parts of tris-(2,3-dibromopropyl) phosphate and 650 parts of n-pentane; and (c) 10,000 parts of styrene, 200 parts of acrylonitrile and 2 parts of divinylbenzene in the presence of 300 parts of 1,2,5,6,9,10-hexabromocyclododecane and 600 parts of pentane.

Finely divided expandable compositions are obtained according to (a), (b) and (c); they may be processed into microporous foam products.

I claim:

1. A self-extinguishing expandable thermoplastic polymer composition comprising:
    (A) a thermoplastic styrene copolymer consisting of at least 80% by weight of styrene units, 0.5 to 5% by weight of acrylonitrile units and not more than 15% by weight of units of at least one monomer selected from the group consisting of the esters of methacrylic acid and acrylic acid with alcohols which contain one to eight carbon atoms, nuclear halogenated styrenes and nuclear alkylated styrenes, and
    (B) an organic bromine compound having a bromine content of more than 50% by weight in such an amount that the bromine content of the mixture with reference to the styrene copolymer is between 0.5 and 6% by weight, said organic bromine compound being selected from the group consisting of aliphatic and cycloaliphatic compounds containing a plurality of bromine atoms, and esters and acetals of 2,3-dibromopropanol.

2. A composition as claimed in claim 1 wherein said copolymer consists of about 97 to 99% by weight of styrene and about 1 to 3% by weight of acrylonitrile units.

3. A composition as claimed in claim 1 containing as an expanding agent 2 to 20% by weight, with reference to said styrene copolymer, of a volatile organic compound selected from the group consisting of saturated aliphatic hydrocarbons and perchloroperfluorocarbons having a boiling point below 100° C.

4. A composition as claimed in claim 1 wherein component (B) is 1, 2, 5, 6, 9, 10-hexabromocyclododecane.

5. A composition as claimed in claim 1 wherein component (B) is 1, 2, 5, 6-tetrabromocyclooctane.

6. A composition as claimed in claim 1 wherein component (B) is tris-(2,3-dibromopropyl) phosphate.

7. A composition as claimed in claim 1 wherein component (B) is pentabromomonochlorocyclohexane.

8. A composition as claimed in claim 3 wherein said expanding agent is a saturated aliphatic hydrocarbon containing five carbon atoms.

References Cited

UNITED STATES PATENTS

| | | | |
|---|---|---|---|
| 3,001,954 | 8/1961 | Buchholz et al. | 260—2.5 |
| 3,004,935 | 10/1961 | Raley et al. | 260—2.5 |
| 3,026,274 | 3/1962 | McMillan et al. | 260—2.5 |
| 3,058,929 | 10/1962 | Vanderhoff et al. | 260—2.5 |

FOREIGN PATENTS 655,124  1/1963  Canada.

MURRAY TILLMAN, *Primary Examiner.*

M. FOELAK, *Assistant Examiner.*